No. 735,148.

Patented August 4, 1903.

UNITED STATES PATENT OFFICE.

ALEXANDER SYDNEY RAMAGE, OF CLEVELAND, OHIO.

PROCESS OF PRODUCING FOOD PRODUCTS FROM WHEY.

SPECIFICATION forming part of Letters Patent No. 735,148, dated August 4, 1903.

Application filed January 27, 1902. Serial No. 91,417. (No specimens.)

*To all whom it may concern:*

Be it known that I, ALEXANDER SYDNEY RAMAGE, a citizen of the United States, residing at Cleveland, in the State of Ohio, have invented new and useful Improvements in Processes of Producing Food Products from Whey, of which the following is a specification.

This invention consists in a process of treating whey to produce therefrom a food product containing the whey proteids, especially lactalbumin and lactoglobulin, with or without lactose.

In carrying out this process one thousand parts, by volume, of clear whey—for example, one thousand liters—are rendered slightly alkaline with any suitable agent—for example, lime-water or sodium carbonate. The whey is then concentrated, preferably *in vacuo*, the temperature being maintained between 60° centigrade and 64° centigrade until the volume has been reduced to about three hundred liters. The concentrated whey is then allowed to cool, and at least one hundred and fifty liters of pure alcohol are added. After the mixture stands for about one hour the whey proteids, especially lactalbumin and lactoglobulin, are precipitated. The solid products are then removed, washed with alcohol, and dried, preferably at 40° centigrade, *in vacuo*. The filtrate and washings are afterward distilled to recover the alcohol. The resulting food product, consisting of a mixture of the whey proteids, is soluble in water, is highly nourishing, and is capable of being readily assimilated by invalids and children.

When the process is carried out as described, the product contains no lactose or milk-sugar, as this remains in the filtrate. Any desired percentage of the lactose may, however, be precipitated at the same time as the proteids by evaporating the whey to a smaller volume than that specified—say to two hundred liters—before adding the methyl alcohol. If the whey be evaporated to one hundred and fifty liters, and an equal volume of alcohol added, all of the lactose will be precipitated with the proteids.

I claim—

1. The process of producing a food product from whey, which consists in rendering the whey slightly alkaline, concentrating it to at least one-third its volume, adding sufficient alcohol to precipitate the whey proteids, and drying the precipitate, as set forth.

2. The process of producing a food product from whey, which consists in concentrating the whey to less than three-tenths of its volume, adding sufficient alcohol to precipitate the whey proteids and the desired amount of the lactose, and drying the precipitate, as set forth.

3. The process of producing a food product from whey, which consists in rendering the whey slightly alkaline, concentrating it to less than three-tenths of its volume, adding sufficient alcohol to precipitate the whey proteids and the desired amount of the lactose, and drying the precipitate, as set forth.

4. The process of producing a food product from whey, which consists in concentrating whey to less than three-tenths of its volume, adding sufficient alcohol to precipitate the whey proteids and the desired amount of the lactose, and drying the precipitate, as set forth.

In testimony whereof I affix my signature in presence of two witnesses.

ALEXANDER SYDNEY RAMAGE.

Witnesses:
A. E. GILBERT,
C. R. CARRUTH.